United States Patent [19]

Jones et al.

[11] Patent Number: 4,723,267

[45] Date of Patent: Feb. 2, 1988

[54] TELEPHONE LINE INTERFACE AND DIALER CIRCUITRY FOR TELECOMMUNICATIONS EQUIPMENT

[75] Inventors: Kenneth D. Jones, Atkinson, N.H.; Ian R. Davison, Andover, Mass.

[73] Assignee: Octocom Systems, Inc., Wilmington, Mass.

[21] Appl. No.: 745,601

[22] Filed: Jun. 17, 1985

[51] Int. Cl.$^4$ ............................................. H04M 11/00
[52] U.S. Cl. ........................................ 379/93; 379/443
[58] Field of Search ............... 179/2 A, 2 AM, 2 C, 179/2 DP, 5 R, 5 P, 17 B, 19, 20, 84 C, 90 D, 99 E, 99 H; 379/37, 40, 51, 93, 97, 98, 102, 104–107, 161, 162, 184, 194, 199, 200, 442, 443

[56] References Cited

U.S. PATENT DOCUMENTS

| | | | |
|---|---|---|---|
| T949,003 | 8/1976 | Earle et al. | |
| 3,595,999 | 7/1971 | Cole | 179/5 P X |
| 4,104,486 | 8/1978 | Martin et al. | 179/2 AM X |
| 4,203,006 | 5/1980 | Mascia | 179/2 C |
| 4,241,237 | 12/1980 | Paraskevakos et al. | 179/2 AM |
| 4,306,116 | 12/1981 | McClure et al. | 179/2 DP |
| 4,500,754 | 2/1985 | Mackey | 179/2 C X |
| 4,558,183 | 12/1985 | Corris et al. | 179/81 R X |
| 4,640,988 | 2/1987 | Robinton | 379/93 X |
| 4,656,318 | 4/1987 | Noyes | 379/93 |

FOREIGN PATENT DOCUMENTS 2851849 7/1980 Fed. Rep. of Germany .
2471096 6/1981 France .

OTHER PUBLICATIONS

*Telephony's Dictionary*, © 1982, Telephony Publishing Co., TK 5102 L3, p. 96.
Edison et al., "Integrated Data Communication Systems", *Proceedings of the National Electronics Conference*, vol. 37, 1983, Oak Brock, Ill., U.S., pp. 507–515.
R. Lambley, "Multi-Standard Modem", *Wireless World*, vol. 90, No. 1582, July 1984, pp. 45–47.

*Primary Examiner*—Keith E. George
*Attorney, Agent, or Firm*—Joseph S. Iandiorio

[57] ABSTRACT

Apparatus (10) for providing isolation and interconnection between the tip (1) and ring (2) conductors of a telephone line and data communications equipment to be connected thereto, such as a modem or other device (12). The apparatus serves also as a circuit for dialing the telephone, responsive to dialing signals applied thereto. All switching is done electronically, eliminating the need for mechanical relays. A diode bridge (18) is connected to the tip (1) and ring (2) conductors of the telephone line; the active circuitry of the interface derives power through the bridge. A switchable constant-current load (48, 20, 22) is placed across the output nodes of the bridge. The load is switched by an opto-isolator (40) which, in turn, is controlled by the line-seizing switch of the data communications equipment. When the line-seizing switch is closed (i.e., the device is off-hook), the opto-isolator (40) causes the switchable load to place a low impedance d.c. load across the tip and ring conductors while presenting a high a.c. impedance, for drawing the necessary current to seize and hold the line. When the hook switch is open (i.e., the device is on-hook), the load is switched off, presenting a high d.c. impedance as well as a high a.c. impedance. Make-break dialing is accomplished by applying dialing pulses to the same control line (38) as connects to the line-seizing switch.

15 Claims, 2 Drawing Figures

TELEPHONE LINE INTERFACE AND DIALER CIRCUITRY FOR TELECOMMUNICATIONS EQUIPMENT

FIELD OF THE INVENTION

This invention relates to the fields of telephony and digital communications. More particularly, it relates to interface and isolation circuitry for use between a telephone line from a central switch and the tip and ring conductors of customer premises equipment, such as a modem or similar telecommunications equipment or device. In addition to providing isolation, the circuitry also is adapted for solid-state make-break telephone dialing.

BACKGROUND OF THE INVENTION

In connecting various types of communications equipment to a public telephone network, numerous requirements must be met. Among these requirements are standards for the electrical isolation which must be maintained between the telephone lines and any customer premise equipment (CPE) attached thereto. Such CPE includes modems and other telecommunications equipment which are powered at the customer premises from power sources which are independent of the telephone lines. In some parts of the world, the isolation between the telephone line and the CPE must be able to withstand a constant potential of at least five thousand volts.

Providing such isolation is not a simple matter since there usually are conflicting requirements to be satisfied. The principal conflict is between the need for isolation, on the one hand, and the need for low insertion loss, on the other. That is, very little attenuation of the voice frequency (i.e., voice or data) signal is permitted; this implies a low impedance connection. Isolation, however, implies a high impedance between the points to be isolated.

Naturally, other requirements of the telephone switching system also must be taken into account. For example, the telephone central switching office detects the condition of the CPE as being either on-hook or off-hook by detecting, respectively, the absence or presence in the tip and ring conductors of a d.c. loop current of about 20-100 mA. This current must be interrupted for pulse dialing, however, at a rate of about 10 pulses per second and subject to other limitations. Thus the interface must not only be capable of placing an appropriate load across the tip and ring conductors to establish the appropriate line current, but also it must be capable of providing an appropriate make-brake waveshape for dialing.

Moreover, there are typically several circuits which must connect to the telephone line, and isolation is required for each. For example, there are circuits for supplying, transmitting and receiving voice and/or data, circuits for switching between voice and data transmission, circuits for detecting the presence of a ring signal and circuits for dialing telephone numbers to be called. In addition, there may be circuits for detecting the presence of line current, indicating that the equipment is connected to an operational telephone line, and for monitoring the line to detect any disconnection which may occur subsequent to the initiation of the connection.

The isolation requirements are not easily or inexpensively achieved in the face of these functional requirements and complex interconnections. Indeed, isolation is achieved only at a cost. First, the expense of the equipment is increased by the price of the various components which must be used to achieve the required isolation. Many of these components do not otherwise contribute significantly to the performance of the equipment and would not be needed but for the isolation standards. Second, such components add to the physical size of the equipment and consume valuable area on circuit boards, whereas the manufacturer and the user generally desire to limit the size of the circuit boards and the equipment itself. These components include relays and a line holding coil, elements which frequently are among the larger or largest circuit elements.

In the present invention, we have sought an effective telephone line interface which provides the required isolation from the telephone line.

We have further sought to provide an interface which is less expensive than prior interface circuitry.

Another objective of the provision of a telephone line interface which does not requrie mechanical relays.

Yet another of our objectives has been to provide an effective telephone line interface which is adaptable to being built smaller than prior interface circuitry.

Still another object is to provide telephone line interface circuitry which signals hook switch status and dialing pulses while avoiding use of mechanical relays.

SUMMARY OF THE INVENTION

These and other objects are achieved by completely solid-state interface circuitry which provides isolation and interconnection between the tip and ring conductors of a telephone line and data communications equipment (i.e., CPE) to be connected thereto, such as a modem or other device. (Reference to a "modem" hereinafter should be understood to be exemplary of CPE, in general, unless otherwise indicated.) The interface circuitry is characterized by the use of only two isolation barriers, a transformer and an opto-isolator. All switching is done electronically, eliminating the need for mechanical relays; and an electronic circuit substitutes for the traditional line holding coil.

According to a first aspect of the invention, a diode bridge is connected to the tip and ring conductors of the telephone line; the active circuitry of the interface derives power through the bridge.

According to a second aspect of the invention, a switched, substantially-constant-d.c. load is placed across the output nodes of the bridge (thereby operatively being placed across the tip and ring conductors). That d.c. load is a circuit that performs essentially as a pure resistance. The load is switched on and off by an opto-isolator which, in turn, is controlled by the hook switch (or an analogous switch) in the customer's equipment. Below, for purposes of generality, such a switch will be referred to as the CPE's line-seizing switch. When the line-seizing switch is closed (i.e., the device is off-hook), the opto-isolator causes the load circuit to be placed as what appears as a low impedance d.c. load across the tip and ring conductors while presenting a high a.c. impedance, for drawing the necessary current to sieze and hold the line. When the line-seizing switch is open (i.e., the device is on-hook), the load is switched off, presenting a high d.c. impedance as well as a high a.c. impedance. The switched load thus doubles as an electronic line holding coil and as a hook switch. In like fashion, when the CPE is a modem or like device, the modem line-seizing switch turns the load circuit on and off for make-break pulse dialing. The isolation previously inherently provided between the winding of the on-hook/off-hook relay and its switching contacts is thus achieved by controlling the solid-state load with an opto-isolator.

Thus, only two isolation barriers are required. The first barrier is provided by the transformer which provides a.c. signal coupling between the modem and the telephone line via the interface circuitry. (It is problematic whether the transformer is considered part of the modem or part of the interface circuitry and it is not necessary to draw a distinction here.) The second barrier is provided by the opto-isolator.

The invention is pointed out with particularly in the appended claims. The above and further objects, features and advantages of the invention may be better understood by referring to the following detailed description, which should be read in conjunction with the accompanying drawing.

DETAILED DESCRIPTION OF ILLUSTRATIVE EMBODIMENTS

Figure 1:
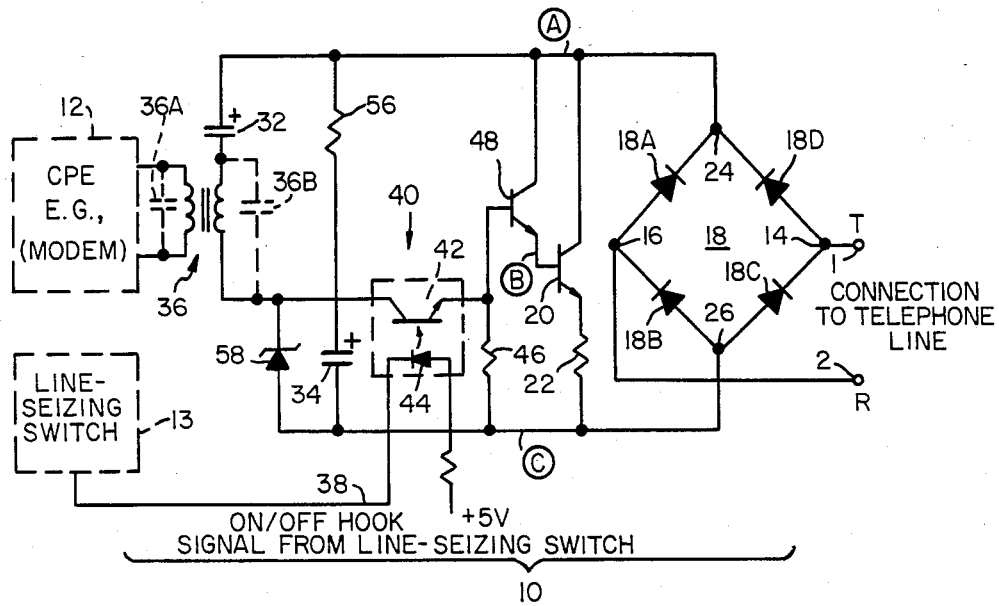
FIG. 1 is a schematic circuit diagram of a first embodiment of the present invention.

An exemplary circuit for the present invention is shown in FIG. 1. As indicated, the terminals 1 and 2 of the interface circuitry 10 connect between conventional modem circuitry 12 and a subscriber's telephone line (indicated but not numbered). The tip (T) and ring (R) conductors of the telephone line are connected via terminals 1 and 2 to the input nodes 14 and 16, respectively, of a full-wave diode bridge 18 consisting of diodes 18A–18D. The cathodes of diodes 18A and 18D are tied together to form the positive output node of the bridge and the anodes of diodes 18B and 18C are tied together to form the negative output node of the bridge.

Digressing briefly, it should be understood that a public telephone network, looking toward the switching office from the subscriber's line, appears as a source of a d.c. potential of about 48–50 volts in series with an impedance of about 200 ohms in each of the tip and ring conductors. When a subscriber's telephone or other device is connected to the telephone line (i.e., is connected electrically, by going "off-hook"), it completes a circuit across the tip and ring conductors, causing a current of about 20-100 mA to be drawn through the telephone line and the subscriber's device. Equipment at the switching office detects this current as evidence that the subscriber's equipment (i.e., CPE) is off-hook, and initiates appropriate actions which depend on whether the subscriber is initiating a call or receiving a call. If the customer is initiating a call, the customer or his dialing equipment will, after having gone off-hook and "siezed" the telephone line, dial the destination telephone number. Two types of dialing are in use; tone dialing and pulse dialing. When pulse dialing is used, the line current is interrupted at a rate of about ten times (i.e., pulses) per second; line current interruption of a more substantial duration is treated as an on-hook indication calling for disconnection from the line.

The use of bridge 18 allows the interface circuitry to be powered from the telephone line and permits the use of bipolar or MOS technology, as desired. The voltage drop of about 1.2 volts across the diodes of bridge 18 is tolerable as it leaves sufficient voltage to power the interface circuitry; and at the same time, that voltage drop plus the drop across the interface circuitry need not exceed the permissible voltage drop across the tip and ring conductors in the off-hook condition.

The transistor 20 is the counterpart of the off-hook relay used in the prior art, and together with the associated current-setting circuitry it functions as a constant load to provide an electronic equivalent of the conventional line holding coil. When transistor 20 is turned on in the manner described below, the circuitry for controlling transistor 20 (i.e., capacitor 34) ignores a.c. signal components across bridge nodes 24 and 26 so as to present a high a.c. impedance across those nodes. But to d.c., there is only a low collector-emitter resistance in series with the associated emitter load resistor 22; thus there is a low impedance path for d.c. only, from the tip conductor through bridge 18, transistor 20 and resistor 22, to the ring conductor. This path is adequate to cause the required minimum d.c. loop current of 20 mA in the tip and ring conductors. The a.c. impedance (nominally 600 ohms, by convention) is achieved by the series path of capacitors 32 and 34 with the associated winding of transformer 36.

By virtue of this high a.c. impedance and low d.c. impedance, the load circuit resembles an inductor such as has conventionally been used for a telephone line holding function. Moreover, with transistor 20 cut off, it presents a high d.c. impedance, as well; the remaining circuitry draws very little current, so the loop current falls below 20 mA and the switching office equipment interprets the condition as the CPE being "on-hook". Thus transistor 20 and its control circuitry serve a dual purpose: in addition to the line holding function, they act as an on-hook/off-hook relay or switch i.e., as a hook switch. Further this switching arrangement avoids the problems of relay switching, such as mechanical contact bounce and the fast make/break requirements of pulse dialing.

With transistor 20 turned on, at any given time just two of the diodes in bridge 18 are forward biased and conducting, either diodes 18A and 18C or diodes 18B and 18D; the other two diodes are reverse biased. The diode pair which is forward biased depends on the polarity of the tip and ring conductors relative to nodes 24 and 26. However, telephones and data transmission equipment both rely on a.c. voice frequency signals for the transmission of information. These a.c. signals are of low amplitude compared to and are superimposed on the d.c. line current; and since the diodes are already forward biased, the a.c. signals pass unimpeded through the bridge. A.c. signals thus pass freely between the tip and ring conductors, on the one hand, and one winding of coupling transformer 36, on the other, via bridge 18 and d.c. blocking capacitors 32 and 34 (which present a low a.c. impedance at voice frequencies).

The operation of transistor 20 is controlled by an on-hook/off-hook signal supplied on line 38 from a line-seizing switch 13 is in the CPE to an opto-isolator 40 by circuitry which is not shown since it fornms no part of this invention and is within the CPE. Opto-isolator 40 comprises a photo-transistor 42 and an associated light-emitting diode (LED) 44. With the signal on line 38 presented in a first (e.g., low) state, the LED 44 is turned on, which causes photo-transistor 42 to conduct and thereby effectively connect the base of transistor 48 to the junction of resistor 56 and capacitor 34. This turns on transistors 48 and 20, which are arranged in a high-gain Darlington connection. Resistor 46 is a bias resistance to ground for the base of transistor 48; its value, however, must be low enough that the resulting voltage does not turn on that transistor when the current through the resistor is the photo-transistor's dark current. The voltage across resistor 46 appears, less the base-emitter junction voltage drops of transistors 48 and 20, across resistor 22, to set the emitter current of transistor 20. In turn, the voltage across capacitor 34 (minus the collector-emitter voltage of opto-isolator transistor 42) supplies the voltage on resistor 46. The Darlington transistor action provides high gain to turn transistor 20 on and off quickly while providing negligible load across capacitor 34.

Zener diode 58 and capacitor 34 are effectively connected to the emitter of transistor 42 when the LED 44 is illuminated. Resistor 56 provides the charging current for capacitor 34. Thus, after it charges up, capacitor 34 serves to maintain an essentially constant voltage on the base of transistor 48, providing a steady line current through transistor 20 and resistor 22. When a ring signal is received over the tip and ring conductors, the voltage across bridge nodes 24 and 26 increases significantly and Zener diode 58, in turn, is switched on. This connects bridge node 26 directly to one terminal of transformer 36 and forces a voltage swing to appear across the transformer. This voltage swing can be detected on the other side of the transformer, as evidence of a ring signal.

The signal supplied on line 38, in addition to being a line-seizing (i.e., on-hook/off-hook) signal, similarly serves, in the case of pulse dialing, as a dialing signal, as well.

Capacitors 36A and 36B are optional and may be used to compensate for return losses in transformer 36.

Thus, the line current itself provides the power to drive the interface circuitry, whether the CPE is turned on or not. The CPE only controls the on-hook/off-hook signal applied on line 38. The on-hook/off-hook signal typically is provided by a relay or switch having one contact connected to line 38 and another contact connected to the return for the 5 volt supply for LED 44. When the CPE is turned off or is on hook, the relay or switch contacts are open and LED 44 therefore is extinguished. When the CPE goes off-hook, the contacts close, turning on the LED and, in turn, the photo-transistor 42.

Figure 2:
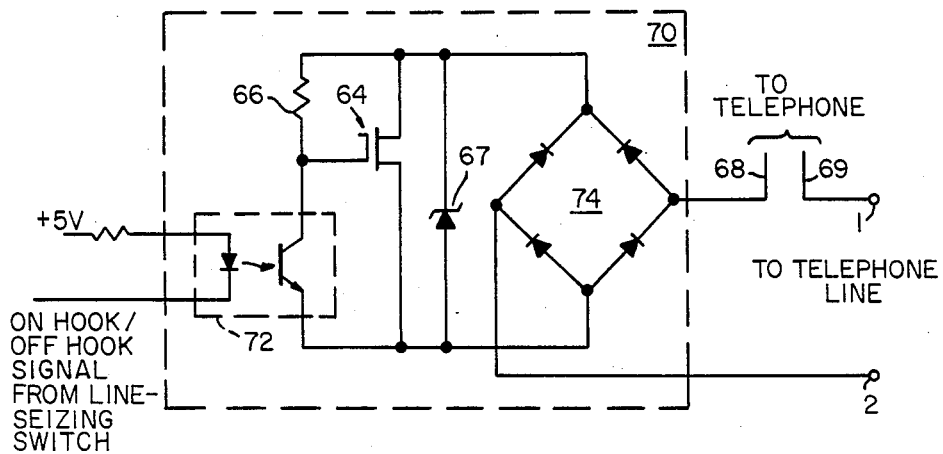
FIG. 2 is a schematic circuit diagram of an optional feature of the present invention.

An additional feature is shown in FIG. 2, wherein a voice switch 70 is added to the circuitry of FIG. 1 to connect the telephone line to a telephone (for voice communication). The circuitry of FIG. 1 is not repeated, for clarity of presentation. The switch is electronic, in contrast to the prior art, which generally employed a mechanical switch such as a relay. This switch, like the switch of transistor 20, is controlled through an opto-isolator 72. The switch, indicated generally at 70, is placed in series between the telephone (not shown, but indicated as connectable to lines 68 and 69) and the ring conductor R (i.e., terminal 2). Line 68 is connected to a first node of a diode bridge 74, with the ring conductor connected to the opposite node of the bridge. The drain and source of a FET switching transistor 64 are connected across the other two nodes of the bridge, as are circuitry for controlling FET 64 and a Zener diode 67; the latter is solely for protection against excessive voltages. The circuitry for controlling FET 64 comprises opto-isolator 72 and bias resistor 66. When the CPE goes off-hook, opto-isolator 72 is turned on, turning off FET 64 (and switch 70) and thereby disconnecting the telephone from the telephone line. Conversely, when the CPE goes on-hook, opto-isolator 72 is turned off and FET 64 is turned on via high resistance bias resistor 66; that, of course, connects the telephone to the telephone line through the diode bridge and FET 64.

Having thus described an exemplary embodiment of the invention, it will be apparent that various alterations, modifications and improvements will readily occur to those skilled in the art. Such obvious alterations, modifications and improvements, though not expressly described above, are nevertheless intended to be implied and are within the spirit and scope of the invention. Accordingly, the foregoing discussion is intended to be illustrative only, and not limiting; the invention is limited and defined only by the following claims and equivalents thereto.

What is claimed is:

1. Apparatus for interconnecting a data communications device to the tip and ring conductors of a telephone line, the data communications device including a line-seizing switch for providing an off-hook signal when said device is off-hook (i.e., is to be connected to the telephone line), said interconnecting apparatus comprising:

a. tip and ring terminals for connection, respectively, to the tip and ring conductors of a telephone line;
   b. a voice-frequency signal path between the tip and ring terminals, on the one hand, and the data communications device, on another;
   c. an electronic, switchable, substantially constant d.c. load circuit operatively connected in parallel across the tip and ring terminals;
   d. the switchable, constant load being actuable in response to a control signal applied thereto such that when the line-seizing switch is closed and the off-hook signal is present, the switchable load places a low impedance d.c. load across the tip and ring terminals while presenting a high a.c. impedance, for drawing the necessary current to seize and hold the telephone line, and when the line-seizing switch is open and the off-hook signal is absent, the switchable load is switched off and deactuated, presenting a high d.c. impedance as well as a high a.c. impedance across the tip and ring terminals, without disconnecting the switchable load circuit from the tip and ring terminals;
   e. the switchable load circuit also being adapted to perform make-break dialing of the telephone line responsive to said control signal, by the switching off of the load circuit without disconnecting the switchable load circuit from the tip and ring terminals;
   f. means for generating the control signal, such means comprising first solid state isolation means having an input for connection to the line-seizing switch of the device and having an output electrically isolated from said input, for providing the control signal in a first state responsive to the presence of the off-hook signal and for providing the control signal in a second state responsive to the absence of the off-hook signal;
   g. second solid state isolation means having a control input terminal for receiving a controlled input signal and a controlled output electrically isolated therefrom, the state of the output being responsive to the control input signal; and h. an electronic, relayless switch having switching terminals connectable in series between a telephone and the tip and ring conductor of the telephone line and being responsive to a control signal supplied to a control input thereof, the output of the second solid state isolation means being operatively connected to the control input of such electronic switch.

2. The apparatus of claim 1 wherein the control input terminal of the second solid state isolation means is connected to receive the same control signal as is applied to the first solid state isolation means.

3. The apparatus of claim 1 wherein the second solid state isolation means comprises an opto-isolator and the electronic switch comprises a transistor controlled by the opto-isolator.

4. The apparatus of claim 1 further including means for deriving from the telephone line operating potential for the electronic switch and the second solid state isolation means.

5. Apparatus for interconnecting a data communications device to the tip and ring conductors of a telephone line, the data communications device including a line-seizing switch for providing an off-hook signal when said device is off-hook (i.e., is to be connected to the telephone line), said interconnecting apparatus comprising:

a. tip and ring terminals for connection, respectively, to the tip and ring conductors of a telephone line;

b. a voice-frequency signal path between the tip and ring terminals, on the one hand, and the data communications device, on another;

c. an electronic, switchable, substantially constant d.c. load circuit operatively connected in parallel across the tip and ring terminals;

d. the switchable, constant load being actuable in response to a control signal applied thereto such that when the line-seizing switch is closed and the off-hook signal is present, the switchable load places a low impedance d.c load across the tip and ring terminals while presenting a high a.c. impedance, for drawing the necessary current to seize and hold the telephone line, and when the line-seizing switch is open and the off-hook signal is absent, the switchable load is switched off and deactuated, presenting a high d.c. impedance as well as a high a.c. impedance across the tip and ring terminals, without disconnecting the switchable load circuit from the tip and ring terminals;

e. the switchable load circuit also being adapted to perform make-break dialing of the telephone line responsive to said control signal, by the switching off of the load circuit without disconnecting the switchable load circuit from the tip and ring terminals;

f. means for generating the control signal, such means comprising first solid state isolation means having an input for connection to the line-seizing switch of the device and having an output electrically isolated from said input, for providing the control signal in a first state responsive to the presence of the off-hook signal and for providing the control signal in a second state responsive to the absence of the off-hook signal, such solid state isolation means comprising a first opto-isolator having a light-emitting diode and a phototransistor responsive thereto, the collector and emitter of the phototransistor each being connected to a respective output terminal of the solid state isolation means, one of the output terminals of the solid state isolation means being connected to a substantially constant potential and the other output terminal thereof being connected to the constant current load for supplying the control signal thereto;

g. second solid state isolation means having a control input terminal for receiving a controlled input signal and a controlled output electrically isolated therefrom, the state of the output being responsive to the control input signal; and h. an electronic, relayless switch having switching terminals connectable in series between a telephone and the tip and ring conductor of the telephone line and being responsive to a control signal supplied to a control input thereof, the output of the second solid state isolation means being operatively connected to the control input of such electronic switch.

6. The apparatus of claim 5 wherein the control input terminal of the second solid state isolation means is connected to receive the same control signal as is applied to the first solid state isolation means.

7. The apparatus of claim 5 wherein the second solid state isolation means comprises an opto-isolator and the electronic switch comprises a transistor controlled by the opto-isolator.

8. The apparatus of claim 5 further including means for deriving from the telephone line operating potential for the electronic switch and the second solid state isolation means.

9. Apparatus for interconnecting to the tip and ring conductors of a telephone line a device to be connected thereto, comprising:

a. a transformer having a first winding for operative connection to the telephone line and a second winding for operative connection to the device;

b. a capacitor;

c. a full-wave rectifier having first and second nodes for connection to the tip and ring conductors of the telephone line, respectively, and third and fourth nodes across which a d.c. potential is developed when a voltage of a selected polarity is applied across the first and second nodes;

d. the first winding of the transformer being operatively connected in series with the capacitor across the third and fourth nodes of the rectifier;

e. a first electronic, relayless switch circuit having first and second switching terminals and a control terminal for receiving a control signal for controlling the state of the switch circuit, the control terminal being electrically isolated from the switching terminals;

f. a switchable load (i.e., current sink) circuit connected across the third and fourth nodes of the rectifier and actuable in response to a switching potential applied to a control point thereof;

g. the first switching terminal of the switch circuit being operatively connected to a source of switching potential;

h. the second switching terminal of the switch circuit being operatively connected to the control point of the switchable load;

i. upon closure of the first switch circuit, responsive to the control signal, the first and second switching terminals being operatively connected to each other for applying the switching potential to the control point of the switchable load;

j. the switchable load circuit placing a low impedance d.c. load across the third and fourth nodes of the rectifier while presenting a high a.c. impedance, for drawing the necessary current to seize and hold the telephone line when the first switch is closed, and presenting a high d.c. impedance as well as a high a.c. impedance across said nodes when the first switch is open, without disconnecting the load circuit from the third and fourth nodes of the rectifier;

k. the switchable load circuit also being adapted to perform make-break dialing of the telephone line responsive to said control signal, without disconnecting the load circuit from the third and fourth nodes of the rectifier;

l. a second electronic, relayless switch circuit, having a pair of switching terminals and a control terminal for receiving a control signal for controlling the state of the second switch circuit, the control terminal being electrically isolated from the switching terminals; and m. the switching terminals of the second switch circuit being connected to place such switch in a series between a telephone and the tip and ring conductors of the telephone line.

10. The apparatus of claim 9 wherein the control terminal of the second electronic switch is connected to receive the same control signal as is applied to the control terminal of the first electronic switch.

11. The apparatus of claim 9 wherein the second electronic switch circuit comprises an opto-isolator and a transistorized switching circuit controlled by the opto-isolator.

12. The apparatus of claim 11 further including means for deriving from the telephone line operating potential for the first and second electronic switches and the switchable load circuit.

13. Apparatus for interconnecting to the tip and ring conductors of a telephone line a device to be connected thereto, comprising:

a. a transformer having a first winding for operative connection to the telephone line and a second winding for operative connection to the device;
b. a capacitor;
c. a full-wave rectifier having first and second nodes for connection to the tip and ring conductors of the telephone line, respectively, and third and fourth nodes across which a d.c. potential is developed when a voltage of a selected polarity is applied across the first and second nodes;
d. the first winding of the transformer being operatively connected in series with the capacitor across the third and fourth nodes of the rectifier;
e. a first electronic, relayless switch circuit having first and second switching terminals and a control terminal for receiving a control signal for controlling the state of the switch circuit, the control terminal being electrically isolated from the switching terminals, said first relayless switch circuit comprising an opto-isolator having a light-emitting diode and a phototransistor, the collector and emitter of the phototransistor each being connected to form a respective one of the first and second switching terminals of said switch circuit, and the control signal being applied to control illumination of the light-emitting diode;

f. a switchable load (i.e., current sink) circuit connected across the third and fourth nodes of the rectifier and actuable in response to a switching potential applied to a control point thereof;

g. the first switching terminal of the switch circuit being operatively connected to a source of switching potential;

h. the second switching terminal of the switch circuit being operatively connected to the control point of the switchable load;

i. upon closure of the first switch circuit, responsive to the control signal, the first and second switching terminals being operatively connected to each other for applying the switching potential to the control point of the switchable load;

j. the switchable load circuit placing a low impedance d.c. load across the third and fourth nodes of the rectifier while presenting a high a.c. impedance, for drawing the necessary current to seize and hold the telephone line when the first switch is closed, and presenting a high d.c. impedance as well as a high a.c. impedance across said nodes when the first switch is open, without disconnecting the load circuit from the third and fourth nodes of the rectifier;

k. the switchable load circuit also being adapted to perform make-break dialing of the telephone line responsive to said control signal, without disconnecting the load circuit from the third and fourth nodes of the rectifier;

l. a second electronic, relayless switch circuit, having a pair of switching terminals and a control terminal for receiving a control signal for controlling the state of the second switch circuit, the control terminal being electrically isolated from the switching terminals; and m. the switching terminals of the second switch circuit being connected to place such switch in a series between a telephone and the tip and ring conductors of the telephone line.

14. The apparatus of claim 13 wherein the control terminal of the second electronic switch is connected to receive the same control signal as is applied to the control terminal of the first electronic switch.

15. The apparatus of claim 13 wherein the second electronic switch circuit comprises an opto-isolator and a transistorized switching circuit controlled by the opto-isolator, and further including means for deriving from the telephone line operating potential for the first and second electronic switches and the switchable load circuit.

* * * * *